Dec. 23, 1969     W. G. SPENCE     3,485,462

AIRCRAFT PROPELLER AND JET DRIVE

Filed Aug. 28, 1967

INVENTOR
WILLIAM GEORGE SPENCE
BY Pierre Lespérance
AGENT

United States Patent Office 3,485,462
Patented Dec. 23, 1969

3,485,462
AIRCRAFT PROPELLER AND JET DRIVE
William G. Spence, 2372 Wilson Ave., Notre Dame
de Grace, Montreal, Quebec, Canada
Filed Aug. 28, 1967, Ser. No. 663,890
Int. Cl. B64d 27/02, 31/00
U.S. Cl. 244—55                                  2 Claims

ABSTRACT OF THE DISCLOSURE

This invention relates to a combined propeller and jet drive for aircraft, and interconnecting drive line, so that the aircraft may use the propellers at low speed and the jet engines at high speed, the system also obtaining balanced forward thrust in the event of failure of one engine.

---

Figures 1, 2:
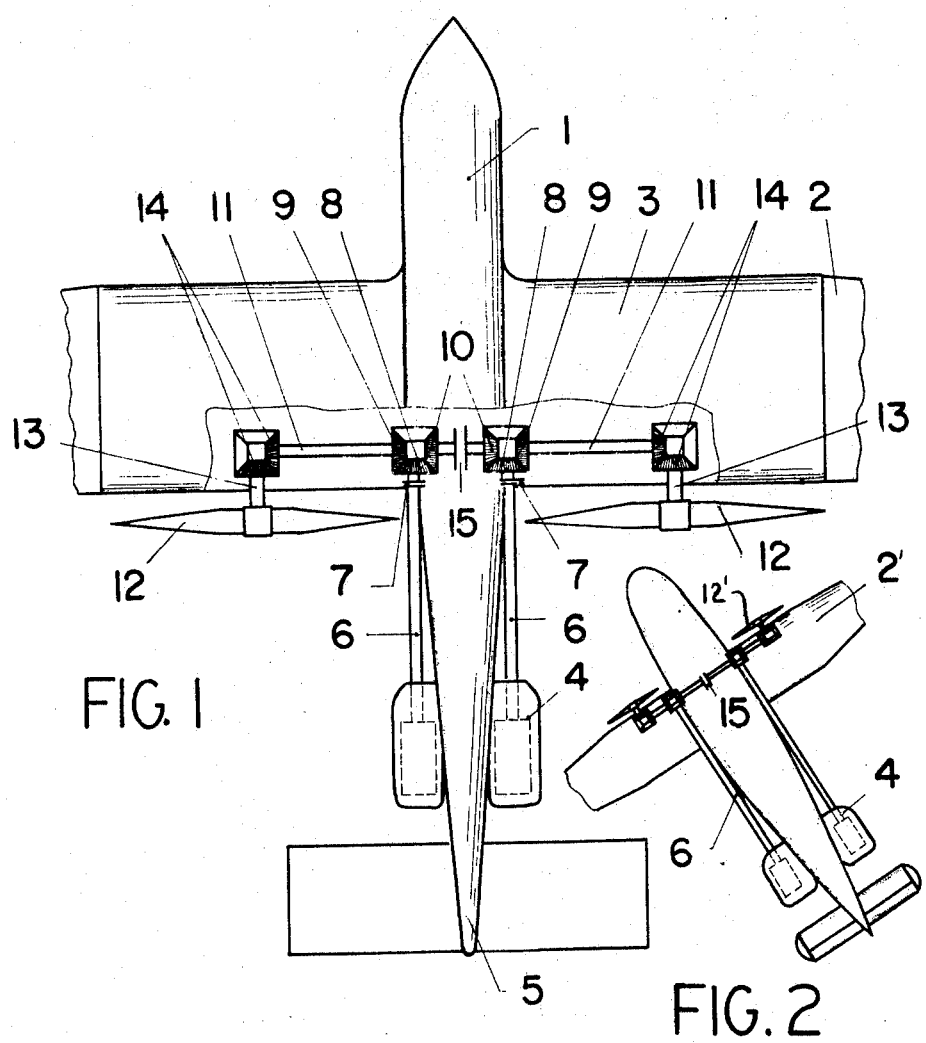

The present invention relates to the propelling or driving arrangement of an aircraft, and has for its object the provision of such an arrangement which is very efficient for landing and take-off, for slow speed flight of the aircraft, and also for obtaining balanced forward thrust in the event of failure of one engine, thereby providing a very safe aircraft.

The foregoing and other objects of the invention will become more apparent during the following disclosure and by referring to the drawings, in which:

FIGURE 1 is a partial top plan view of an aircraft of the channel wing type provided with the propelling system in accordance with the invention; and FIGURE 2 is a partial top plan view of a conventional aircraft provided with the propelling system in accordance with the invention.

Referring to the drawings in which like reference characters indicate like elements throughout, the aircraft of FIGURE 1 is of the channel wing type and comprises a fuselage 1, wings 2 having channels 3. The propelling system of the invention comprises a pair of jet engines 4 mounted on the fuselage 1 on each side thereof forwardly of the tail 5 of the aircraft.

Each jet engine 4 has its turbine rotor connected to a drive shaft 6 extending along the fuselage 1, either inside or outside; each drive shaft 6 drives through a clutch 7, a bevel pinion 8 of a gear box which contains an outside pinion 9 and an inside pinion 10 meshing with common pinion 8. Outside pinion 9 drives a transmission shaft 11 extending along the wing 2 which in turn drives a propeller 12 through the propeller shaft 13 and bevel pinions 14 of a gear box. The propeller 12 is arranged as a pusher propeller at the aft end of the fore and aft running channel 3.

Inside pinion 10 of the first gear boxes are interconnected through a clutch 15. The jet engine drive shafts 6 rotate in opposite directions for counterrotation of the propellers 12, and for rotation of the inside pinions 10 in the same direction of rotation.

For landing and take-off and whenever the aircrift flies at low speed, the propellers are obviously much more efficient than the jet engines. Thus, the turbine rotor of each jet engine is connected to its associated propeller 12, through engaged clutch 7, the common clutch 15 remaining disengaged. Thus, each jet engine 4 drives its associated propeller 12. When the aircraft is in normal high speed flight, the clutches 7 are disengaged and the propeller blades feathered and the aircraft is propelled only by the thrust developed by the jet engines 4.

Moreover, whenever one jet engine fails, it is possible to drive both propellers 12 by engaging the common clutch 15, in which case both propellers will still rotate in counterrotation and will develop the same propelling force. Thus, the pilot can maintain flight in the condition in which it was maintained prior to the failure of one engine or complete any maneuvers contemplated without changing the trim or flight procedure and without encountering assymmetric thrust or lift. The gears of the gear boxes may be arranged to reduce the speed of the propellers or to provide for rotation in the same direction.

FIGURE 2 shows a conventional aircraft provided with the propelling system in accordance with the invention, but driving propellers 12' disposed at the forward edge of the wings 2'. The propelling system is otherwise identical to that of FIGURE 1.

What I claim is:

1. A propelling system for aircraft having a fuselage and wings, said propelling system including a pair of propellers carried by said wings, and a pair of jet engines carried by said fuselage, on each side and rearwardly of the wings and arranged to direct the exhaust gas to the rear and parallel to the longitudinal axis of the aircraft, each jet engine having a rotor, said system further including a first drive line connecting the rotor of one jet engine to a first propeller and a second drive line connecting the rotor of the other jet engine to a second propeller, clutch means in said first and second drive lines to disconnect the jet engine rotors from said propellers, said jet engines directly propelling the aircraft when said propellers are declutched.

2. A propelling system as claimed in claim 1, further including a third drive line interconnecting said first and second drive lines and including a clutching means in said third drive line for disconnecting said first and second drive lines.

References Cited

UNITED STATES PATENTS

| 1,747,334 | 2/1930 | Sundstedt | 170—135.75 X |
| 2,532,481 | 12/1950 | Custer | 244—55 X |
| 2,936,967 | 5/1960 | Dancik | 170—135.7 X |

FOREIGN PATENTS

| 107,099 | 6/1917 | Great Britain. |
| 327,805 | 2/1930 | Great Britain. |

MILTON BUCHLER, Primary Examiner
J. E. PITTINGER, Assistant Examiner

U.S. Cl. X.R.
244—58